J. M. HERRINGTON.
VEHICLE SUPPORT ACTUATING DEVICE.
APPLICATION FILED MAY 29, 1914.
1,150,821.
Patented Aug. 17, 1915.
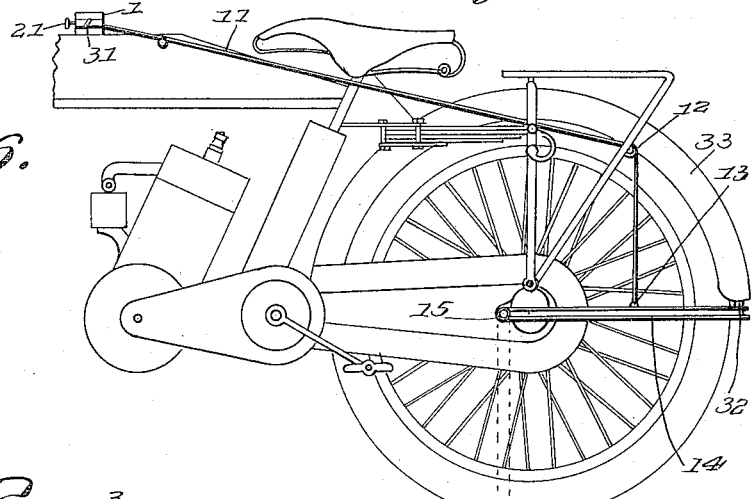
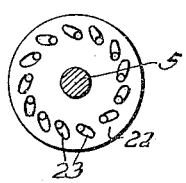
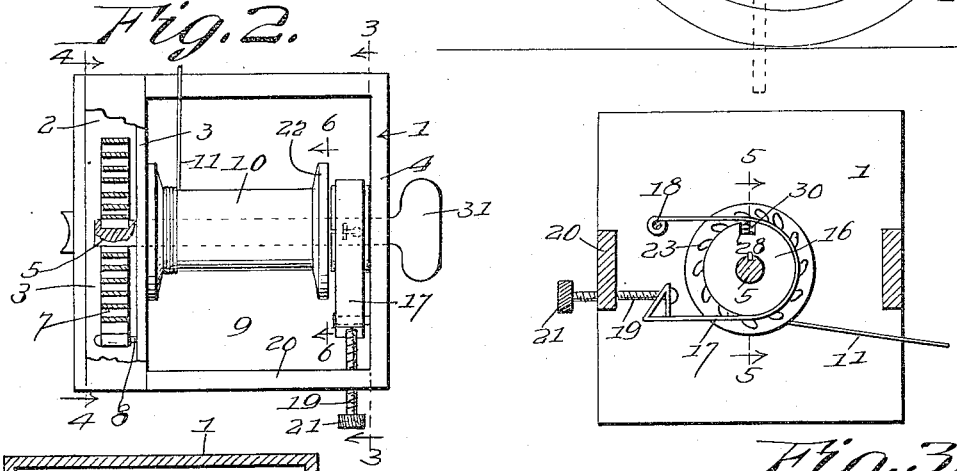
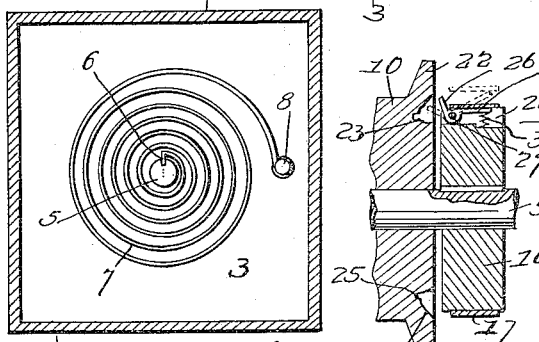
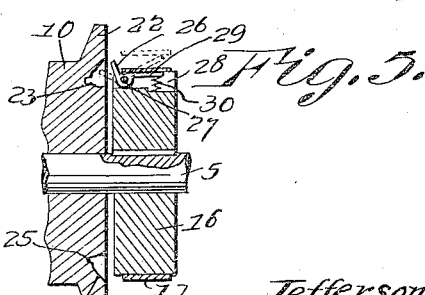
Witnesses
R. A. Bond.
M. A. Bond.
Inventor
Jefferson M. Herrington,
E. H. Bond
Attorney

UNITED STATES PATENT OFFICE.

JEFFERSON M. HERRINGTON, OF PENSACOLA, FLORIDA.

VEHICLE SUPPORT-ACTUATING DEVICE.

1,150,821.   Specification of Letters Patent.   Patented Aug. 17, 1915.

Application filed May 29, 1914. Serial No. 841,953.

*To all whom it may concern:*

Be it known that I, JEFFERSON M. HERRINGTON, a citizen of the United States, and resident of Pensacola, in the county of Escambia and State of Florida, have invented certain new and useful Improvements in Vehicle Support-Actuating Devices, of which the following is a specification.

This invention relates to certain new and useful improvements in supports for motorcycles and bicycles and other vehicles and it has for its objects among others to provide an improved, simple, yet efficient and reliable device of this character by which the rider is enabled to operate the support without getting off the machine, such device embodying few parts, those easily assembled, cheap of manufacture and not liable to get out of order.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation showing my improvement applied to a motorcycle. Fig. 2 is an enlarged detail in elevation with portions broken away and parts in section. Fig. 3 is a section on the line 3—3 of Fig. 2, looking in the direction of the arrows. Fig. 4 is a section on the line 4—4 of Fig. 2, looking in the direction of the arrows. Fig. 5 is a section on the line 5—5 of Fig. 3, looking in the direction of the arrows. Fig. 6 is a section on the line 6—6 of Fig. 2, looking in the direction of the arrows.

Like numerals of reference indicate like parts throughout the several views.

Referring to the drawings, 1 designates a casing containing the operating parts and which may be attached in any suitable manner to any convenient part of the motorcycle or bicycle or other vehicle to which it is to be applied. At one end this casing has a compartment 2 formed by a partition 3, and in this partition and in the opposite wall 4 of the casing there is journaled a shaft 5 to one end of which within the compartment 2 there is affixed in any suitable manner, as at 6, one end of a coiled spring 7, the other end of which is attached to the partition 3 in any well known manner, as seen at 8. Loose upon the shaft 5 within the compartment 9 of the casing is a spool or drum 10 upon which is adapted to be wound a cord or cable 11 passed over a pulley or the like 12 and attached, as at 13, to the stand or support 14 which is pivotally mounted, as at 15, on some fixed part of the machine in the ordinary manner. Fast on the shaft 5 near the end opposite to that to which the spring is attached, is a disk 16 around which passes a brake band 17 fast at one end, as at 18, to any suitable member and the other end having connected therewith a screw 19 which passes through a member 20 of the casing and its outer end provided with a knurled knob or the like 21, whereby the spring band may be put under tension, when desired.

The cord or cable 11 is extended through one side of the casing and connected with and adapted to be wound upon the drum 10.

The head 22 of the drum adjacent the disk 16 is provided with a plurality of holes 23, as seen clearly in Figs. 3, 5 and 6, which holes have a tapered wall 24 and a sunken portion 25, as seen best in Figs. 5 and 6. With these holes there is designed to coöperate a ratchet 26 which is in the form of a two-armed lever pivotally mounted at its angle, as at 27, in a recess 28 in the disk 16, the arm 29 being acted upon by a spring 30 tending to normally keep said arm outermost and the other end of the ratchet in engagement with one of the holes of the head of the spool, as indicated by dotted lines in Fig. 5. The brake band 17 bears against this arm 29, as seen clearly in Fig. 5, and when the band is tightened, it forces said arm 29 inward, compressing the spring 30 and pulling the ratchet out of engagement in its opening in the head of the spool. When the band is loosened, the parts assume their normal position and the ratchet is in engagement with the hole in the head of the spool and the disk 16 is locked to the spool.

31 is a key for winding up the spring 7.

32 is a rubber or analogous strip attached to the mudguard 33 and against which the support 14 engages when it is thrown upward.

The operation will be apparent. With the parts constructed and arranged substantially as hereinbefore described and the device applied as shown in Fig. 1, when the support is up in the position in which it is seen in Fig. 1 and it is desired to lower the same so as to support the motorcycle or other vehicle, all that it is necessary to do is to tighten up on the thumb screw 19 which tightens the brake band 17, compressing the spring 30 and pulling the ratchet 26 out of engagement with the hole in the head of the spool. This holds the spring against action and the weight of the stand or support causes it to drop into position, the ratchet being thrown out of operative relation with the spool. When the rider is ready to move, it is not necessary for him to stoop over or to disengage any part, but by simply loosening up on the thumb screw 19 the ratchet is allowed to move into engagement with an opening in the head of the spool and the spool and disk 16 are thus locked together and the spring operates and picks up the stand or support which will be held in its proper place until the rider is ready to put the stand again into use. As the stand comes up to its horizontal position, it engages the buffer 32 so as to prevent noise and avoid injury to either the support or the mudguard.

The device may be constructed so that the ratchet may work either right or left hand so that it may be employed on either side of the motorcycle or on top or any other part of the machine to which it may be desired to attach it.

Modifications in details may be resorted to without departing from the spirit of the invention or sacrificing any of its advantages.

What is claimed as new is:—

1. A spring actuated shaft having means for winding the spring, a member loosely mounted on said shaft, a brake-controlled member movable with said shaft and interengaging means between said brake-controlled and loosely mounted members and means for controlling the brake member.

2. A spring actuated shaft having means for winding the spring, a spool loosely mounted on said shaft, a disk fast upon the shaft, interengaging means on the spool and disk, and a brake member coöperating with said disk controlling said interengaging means.

3. A spring actuated shaft having means for winding the spring, a spool loosely mounted on said shaft, a disk fast upon the shaft, interengaging means on the spool and disk, a brake member coöperating with said disk controlling said interengaging means, and means for controlling the brake member.

4. In a device of the character described, a spring actuated shaft with a member fixed thereon, a spool normally loosely mounted upon said shaft, a spring actuated member on the fast member engageable with the loosely mounted member, and a brake member coöperating with said disk directly engaging and controlling said spring actuated member.

5. In a device of the character described, a spring actuated shaft, a member fixed thereon, a spool loosely mounted upon said shaft, a spring actuated member engageable with the loosely mounted member and a brake member coöperating with said fixed member and directly engaging and controlling said spring actuated member.

6. A spring actuated shaft, a spool loosely mounted thereon, a spring actuated member fixed on said shaft, means for controlling said spring and allowing the spool to revolve independently thereof, means carried by said fixed member for causing said member and the spool to move together, and a brake member directly engaging said spring actuated member.

JEFFERSON M. HERRINGTON.

Witnesses:
CALEB KAST,
ELBERT A. CLUBBS.